United States Patent
Chow (10) Patent No.: US 10,926,766 B2
(45) Date of Patent: Feb. 23, 2021

(54) ONE-WAY DIRECTION SENSING SYSTEM

(71) Applicant: Toyota Motor Engineering & Manufacturing North America, Inc., Plano, TX (US)

(72) Inventor: Justin J. Chow, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 246 days.

(21) Appl. No.: 16/011,504

(22) Filed: Jun. 18, 2018

(65) Prior Publication Data
US 2019/0382016 A1 Dec. 19, 2019

(51) Int. Cl.
| | |
|---|---|
| B60W 30/18 | (2012.01) |
| G05D 1/00 | (2006.01) |
| G05D 1/02 | (2020.01) |
| B60W 50/14 | (2020.01) |
| B60W 10/20 | (2006.01) |
| B60W 10/02 | (2006.01) |
| B60W 10/16 | (2012.01) |
| G06F 16/29 | (2019.01) |

(52) U.S. Cl.
CPC ...... *B60W 30/18009* (2013.01); *B60W 10/02* (2013.01); *B60W 10/16* (2013.01); *B60W 10/20* (2013.01); *B60W 50/14* (2013.01); *G05D 1/0088* (2013.01); *G05D 1/0223* (2013.01); *G06F 16/29* (2019.01); *B60W 2050/143* (2013.01); *B60W 2520/06* (2013.01); *B60W 2555/60* (2020.02); *B60W 2556/50* (2020.02); *B60W 2556/60* (2020.02); *B60W 2720/24* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 5,913,375 A | * | 6/1999 | Nishikawa ........... G05D 1/0257 180/168 |
| 8,421,648 B2 | | 4/2013 | Konaka et al. |
| 8,917,188 B2 | | 12/2014 | Wietfeld et al. |

(Continued)

FOREIGN PATENT DOCUMENTS

| | | |
|---|---|---|
| DE | 19934774 | 7/1999 |
| DE | 202013005510 | 6/2013 |

(Continued)

*Primary Examiner* — Kenny S Lin
(74) *Attorney, Agent, or Firm* — Snell & Wilmer LLP (57) ABSTRACT

Methods, systems, and apparatus for preventing a vehicle from driving in a wrong direction. The method includes detecting, via a vehicle orientation sensor, a current driving direction of the vehicle. The method also includes detecting, via a GPS unit, a current location of the vehicle. The method also includes providing, by a powertrain, torque to one or more wheels of the vehicle. The method also includes determining, by an electronic control unit (ECU), whether the vehicle is travelling in the wrong direction based on the current driving direction of the vehicle and the current location of the vehicle. The method also includes communicating, by the ECU, an instruction to the powertrain to reduce the torque provided to the one or more wheels of the vehicle when the vehicle is travelling in the wrong direction.

22 Claims, 8 Drawing Sheets

(56) References Cited

U.S. PATENT DOCUMENTS

| | | | |
|---|---|---|---|
| 9,251,707 B2 | 2/2016 | Kugel et al. | |
| 9,836,968 B2 | 12/2017 | Poechmueller et al. | |
| 9,911,334 B2 | 3/2018 | Townsend | |
| 2006/0122754 A1* | 6/2006 | McLaren | A01B 69/008 701/51 |
| 2013/0338850 A1* | 12/2013 | Takahara | G01C 21/26 701/1 |
| 2014/0354454 A1 | 12/2014 | Nordbruch | |
| 2015/0088351 A1* | 3/2015 | Meeks | B60K 1/00 701/22 |
| 2016/0225256 A1 | 8/2016 | Hofsaess et al. | |
| 2016/0343253 A1 | 11/2016 | Imai | |
| 2017/0003134 A1 | 1/2017 | Kim et al. | |
| 2017/0160745 A1* | 6/2017 | Lauffer | G01S 15/931 |
| 2018/0050693 A1 | 2/2018 | Al-Deek et al. | |
| 2018/0218608 A1* | 8/2018 | Offenhaeuser | G08G 1/162 |
| 2018/0257635 A1* | 9/2018 | Meyer | B60W 30/1846 |
| 2018/0281782 A1* | 10/2018 | Salter | B60W 50/14 |
| 2018/0365989 A1* | 12/2018 | Song | B60W 50/16 |
| 2019/0031207 A1* | 1/2019 | Nakamura | B60W 40/10 |
| 2019/0185020 A1* | 6/2019 | Rubinstein | G08G 1/09623 |

FOREIGN PATENT DOCUMENTS

| | | |
|---|---|---|
| EP | 1347425 | 3/2003 |
| NL | 9401749 | 10/1994 |

\* cited by examiner

| TORQUE % AVAILABLE | DISTANCE | TIME | DEGREES FROM NORMAL |
|---|---|---|---|
| 100 | 0 | 0 MIN | 0° |
| 90 | 10 FT | 5 MIN | 20° |
| 80 | 20 FT | 10 MIN | 40° |
| 70 | 30 FT | 15 MIN | 60° |
| ... | ... | ... | ... |
| 10 | 100 FT | 45 MIN | 180° |

ONE-WAY DIRECTION SENSING SYSTEM

BACKGROUND

1. Field

This specification relates to a system and a method for automatically detecting whether a vehicle is being driven in an opposite direction of traffic.

2. Description of the Related Art

Conventionally, each road has an intended direction in which vehicles should travel along the road. For example, there may be two lanes in a road that runs east and west in direction, with a first lane requiring the vehicles to travel from east to west, and a second lane requiring vehicles to travel from west to east. In another example, there may be a freeway on-ramp for vehicles to merge onto a freeway from a surface street, and there may be a freeway off-ramp for vehicles to merge off of a freeway and onto a surface street. When vehicles are driven in a different direction than the direction required, significant danger may befall all vehicles in the vicinity, including the vehicle driving in the wrong direction.

Thus, in the interest of safety, there is a need for systems and methods for automatically detecting whether a vehicle is being driven in an opposite direction of traffic. In addition, in the interest of safety, there is a need for systems and methods for alerting drivers that their vehicle is being driven in an opposite direction of traffic.

SUMMARY

What is described is a system for preventing a vehicle from driving in a wrong direction. The system includes a vehicle orientation sensor configured to detect a current driving direction of the vehicle. The system also includes a GPS unit configured to detect a current location of the vehicle. The system also includes a powertrain configured to provide torque to one or more wheels of the vehicle. The system also includes an electronic control unit (ECU) connected to the vehicle orientation sensor, the GPS unit, and the powertrain. The ECU is configured to determine whether the vehicle is travelling in the wrong direction based on the current driving direction of the vehicle and the current location of the vehicle. The ECU is also configured to communicate an instruction to the powertrain to reduce the torque provided to the one or more wheels of the vehicle when the vehicle is travelling in the wrong direction.

Also described is a method for preventing a vehicle from driving in a wrong direction. The method includes detecting, via a vehicle orientation sensor, a current driving direction of the vehicle. The method also includes detecting, via a GPS unit, a current location of the vehicle. The method also includes providing, by a powertrain, torque to one or more wheels of the vehicle. The method also includes determining, by an electronic control unit (ECU), whether the vehicle is travelling in the wrong direction based on the current driving direction of the vehicle and the current location of the vehicle. The method also includes communicating, by the ECU, an instruction to the powertrain to reduce the torque provided to the one or more wheels of the vehicle when the vehicle is travelling in the wrong direction.

Also described is a vehicle configured to travel along a road having a correct direction and a wrong direction. The vehicle includes a GPS unit configured to periodically detect a current location of the vehicle. The vehicle also includes a powertrain configured to provide torque to one or more wheels of the vehicle. The vehicle also includes an electronic control unit (ECU) connected to the GPS unit and the powertrain. The ECU is configured to determine a current driving direction of the vehicle based on the periodically detected current location of the vehicle. The ECU is also configured to determine whether the vehicle is travelling in the wrong direction based on the current driving direction of the vehicle and the current location of the vehicle. The ECU is also configured to communicate an instruction to the powertrain to reduce the torque provided to the one or more wheels of the vehicle when the vehicle is travelling in the wrong direction.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for automatically detecting whether a vehicle is being driven in a wrong way. As used herein, the phrases "correct way" and "correct direction" shall be used to refer to a situation where the vehicle is being driven properly in a direction that is with the flow of traffic. Also as used, herein the phrases "wrong way" or "wrong direction" shall be used to refer to a situation where the vehicle is being driven in any direction other than the correct direction, or when the direction the vehicle is being driven in deviates from the correct direction by a threshold amount. In some situations, the vehicle is being driven the wrong way when it is driven improperly in a direction that is facing toward oncoming traffic. In many jurisdictions, driving a vehicle in the wrong direction is illegal, and the vehicle should instead be driven in the correct direction.

A vehicle travelling in the wrong direction may strike another vehicle driving toward the wrong-direction vehicle, potentially causing injury to both the occupants of the wrong-direction vehicle and the occupants of the correct-direction vehicle. When vehicles driving in the correct direction are concerned with vehicles being driven in the wrong direction, the correct-direction vehicles may not travel as quickly or as efficiently. Having vehicles travel in their appropriate lanes is important for safe and efficient transportation.

Conventional vehicles are incapable of determining whether the vehicle is being driven in a wrong direction. Accordingly, conventional vehicles are also incapable of providing feedback to the driver of the vehicle to notify the driver that the driver is driving the vehicle in the wrong direction. Conventional vehicles are also incapable of reducing the capabilities of the vehicle to encourage the driver to orient the vehicle in a correct direction.

Systems for encouraging the driver to correct the orientation of the vehicle may be more effective than systems which only notify the driver that the vehicle is being driven in the wrong direction. Further still, systems for warning other vehicles and drivers of other vehicles that a nearby vehicle is being driven in a wrong direction may provide an additional measure of safety.

The systems, vehicles, and methods described herein detect whether a vehicle is being driven in a wrong direction and notify the driver that the vehicle is being driven in the wrong direction. The systems, vehicles, and methods described herein also encourage the driver to reorient the vehicle to be driving in the correct direction by limiting the torque available to the vehicle until the orientation of the vehicle is corrected. This serves not only to encourage the driver to reorient the vehicle to the correct direction, but also as a safety measure to limit the speed of the vehicle being driven in the wrong direction so that if the wrong-direction vehicle were to collide with a correct-direction vehicle, the damage may be reduced compared to a collision between the wrong-direction vehicle and the correct-direction vehicle where the wrong-direction vehicle is travelling at a typical speed. In addition, the systems, vehicles, and methods described herein may also be remotely controlled by a remote device, e.g., a law enforcement device, so for example, if the vehicle is being chased by a law enforcement vehicle and decides to travel in the wrong direction or is driving at an excessive speed or with a dangerous driving style, the remote device can remotely make adjustments to the torque available (may even remotely stop the vehicle) to the vehicle until the law enforcement vehicle catches the violating vehicle or driver.

Figure 1:
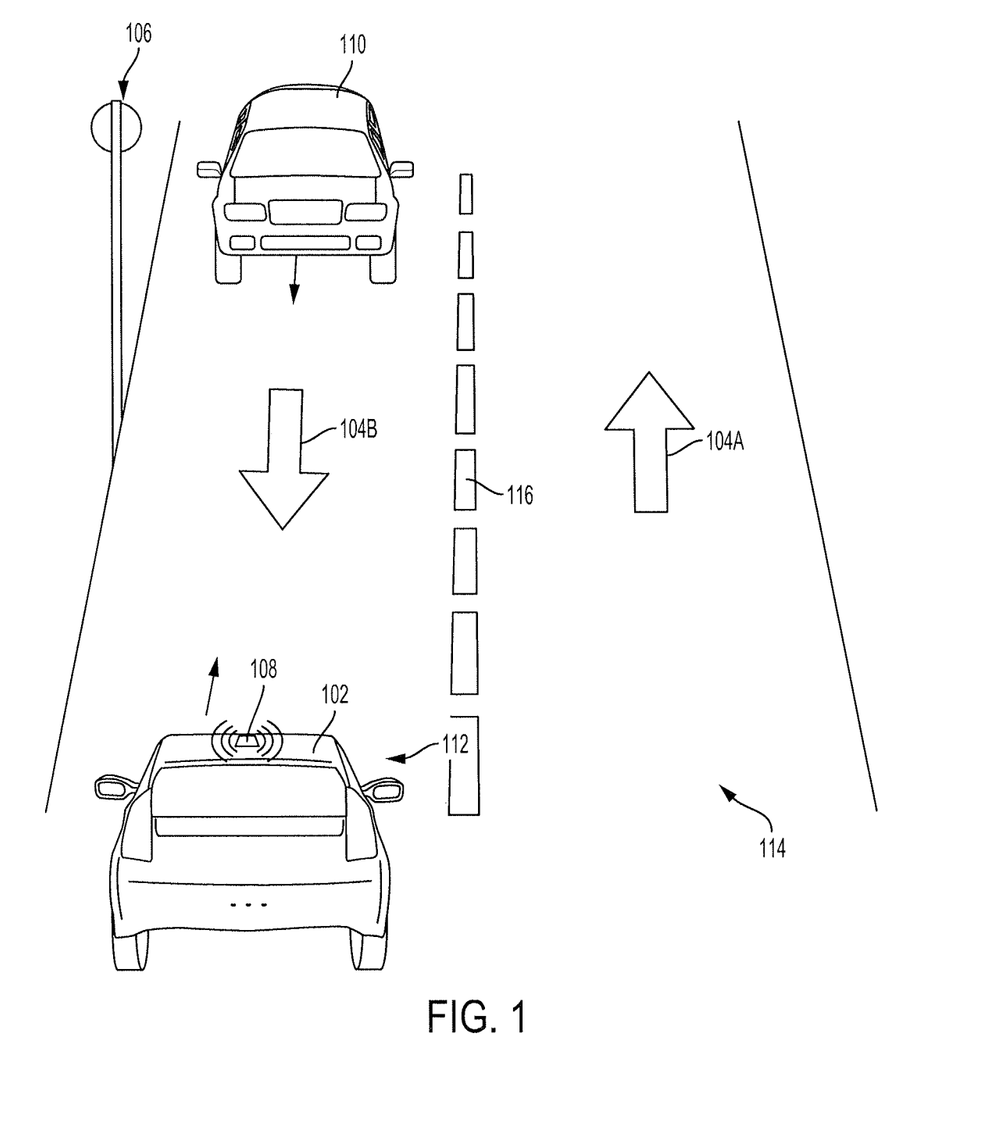
FIG. 1 illustrates a vehicle travelling in a wrong direction, according to various embodiments of the invention.

FIG. 1 illustrates an example scenario for the one-way direction sensing system. A first lane 114 may have a first direction 104A in which vehicles traversing the first lane 114 should travel. An adjacent second lane 112 may have an opposite second direction 104B in which vehicles traversing the second lane 112 should travel. The required direction of travel for a given vehicle may be determined based on the location of the given vehicle. For example, when the vehicle is located within the first lane 114, the vehicle should travel in the first direction 104A, and when the vehicle is in the second lane 112, the vehicle should travel in the second direction 104B.

The vehicle 102 is currently being driven in a wrong direction. The vehicle 102 is in the second lane 112, but travelling in the first direction 104A instead of the second direction 104B. The vehicle 102 is facing an oncoming vehicle 110, which is travelling in the correct direction (the second direction 104B). The vehicle 102 poses a severe safety threat to the oncoming vehicle 110.

The system may determine that the vehicle 102 is being driven in the wrong direction in any number of ways. The vehicle may have an image sensor 108 (e.g., a camera), which detects objects in the vicinity of the vehicle 102 which may provide an indication of the correct direction. For example, the image sensor 108 may detect image data of the back of a sign 106. The detection of the back of the sign 106 may be an indicator that the vehicle 102 is being driven in the wrong direction. In another example, the image sensor 108 may detect a lane marker 116 to the right of the vehicle 102, and no lane marker to the left of the vehicle 102, indicating that the vehicle 102 may be being driven in the wrong direction. In another example, the image sensor 108 may detect arrows, red markers or other markers, signals or words painted on the ground and oriented in an opposite direction, indicating that the vehicle 102 is being driven in the wrong direction.

In other embodiments, the system may determine that the vehicle 102 is being driven in the wrong direction based on the location of the vehicle 102 and the orientation of the vehicle. The location of the vehicle 102 may be determined using a global positioning system (GPS) sensor, and the orientation of the vehicle may be determined by an orientation sensor, such as a gyroscope, or by comparing the location of the vehicle over time. The system may account for areas of ambiguity where traffic may flow in either direction, such as a center turn lane, and may not associate a correct direction or a wrong direction for those areas.

In some embodiments, a display in the passenger cabin of the vehicle 102 (e.g., in the infotainment unit or the instrument panel) may indicate to the driver that the driver is driving in the wrong direction. In some embodiments, the visual indication may be accompanied by an audible indication produced by one or more speakers. In some embodiments, a tactile indication may be provided to the driver via a vibration unit in the steering wheel or the seat of the driver.

While the illustrations and disclosure provided herein have vehicles correctly travelling on the right side of the road, the systems, methods, and vehicles described herein may be used in any jurisdiction and may be adjusted to accommodate for the laws of the jurisdiction (e.g., driving on the left side of the road).

FIGS. 2A-2E illustrate the system limiting the controls of the vehicle 102 when the vehicle 102 is being driven in the wrong direction along a road 230. When the system determines that the vehicle 102 is being driven in the wrong direction, the vehicle 102 may be restricted in its performance in order to encourage the driver to reorient the vehicle 102 to the correct direction, and to limit possible damage and injury if a collision were to occur between the vehicle 102 and an oncoming vehicle.

In some embodiments, the vehicle is restricted in its performance by automatically steering toward the correct direction in a safe manner based on the environment detected by one or more sensors. For example, when the vehicle 102 is capable of being driven fully autonomously or semi-autonomously, the vehicle 102 may automatically correct the orientation of the vehicle 102. In another example, the vehicle 102 may variably control the turning stiffness of the steering wheel, such that when the driver attempts to turn the steering wheel in a correction direction to correct the orientation of the vehicle 102, the steering wheel easily turns, but if the driver subsequently attempts to turn the steering wheel back toward the wrong direction (opposite the correction direction), the turning stiffness of the steering wheel may be increased such that significantly more effort is required to turn the steering wheel back toward the wrong direction.

In another embodiment, the vehicle 102 may determine, based on one or more of sensor data, location data, map data, and traffic data, a safest way to reorient the vehicle 102, and the stiffness of the steering wheel may be varied to encourage the driver to perform the steps of the determined safest way to reorient the vehicle 102. In addition to the variation of the stiffness of the steering wheel, one or more instructions may be presented to the driver in verbal form via a speaker, written form via a display, or in tactile form via a vibration unit on the steering wheel or seat.

In some embodiments, the torque to propel the vehicle that is available to the driver may be limited until the orientation of the vehicle is corrected. In these embodiments, an electronic control unit (ECU) which is capable of controlling one or more functions of the vehicle 102 may control one or more components of the powertrain of the vehicle 102 in order to limit the torque available to the driver.

Figure 2A:
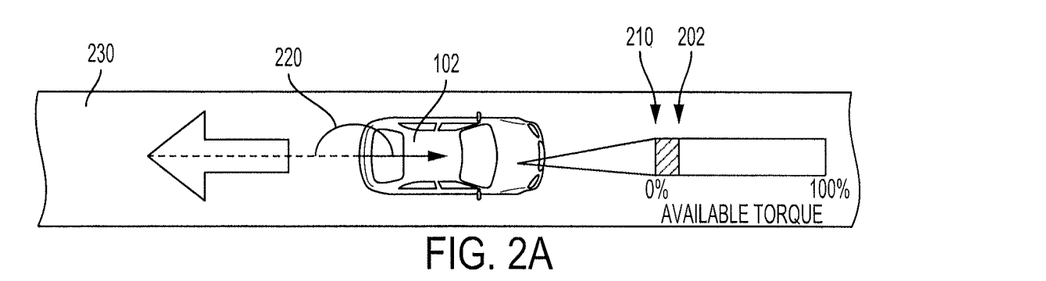
FIGS. 2A-2E illustrate an example system for notifying a driver that the vehicle is being driven in a wrong direction based on orientation of the vehicle, according to various embodiments of the invention.

As illustrated in FIGS. 2A-2E, the available torque of the vehicle may be limited based on the degree by which the vehicle 102 is oriented in the wrong direction. As shown in FIG. 2A, the vehicle 102 is facing the exact opposite direction of the correct direction. The first error degree 220 in this case is 180 degrees. The error degree may be defined as a measurement of the difference between the current orientation of the vehicle and the correct orientation of the vehicle. In the orientation of the vehicle 102 in FIG. 2A, the available torque provided to the vehicle 102 may be a first amount of available torque 202. As it is facing the exact opposite direction, the first amount of available torque 202 may be a minimum non-zero amount of available torque. The first amount of available torque 202 may be greater than a zero amount of available torque 210. The minimum amount of available torque may correspond to the amount of torque necessary to turn the vehicle 102 around. In some embodiments, the minimum amount of torque is between 1% and 20% of the torque that the vehicle 102 is capable of producing.

Figure 2B:
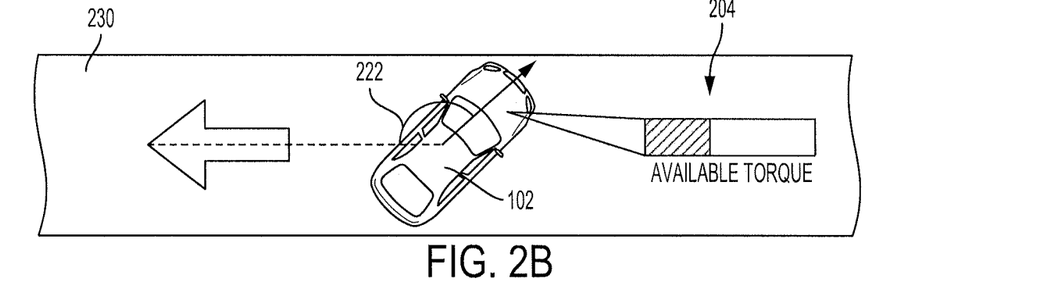

In FIG. 2B, the vehicle 102 has turned to its left, and the error degree has been reduced to a second error degree 222, which is less than the first error degree 220. Accordingly, an increased amount of torque (e.g., a second amount of available torque 204) may be available to the driver. The second amount of available torque 204 is greater than the first amount of available torque 202.

Figure 2C:
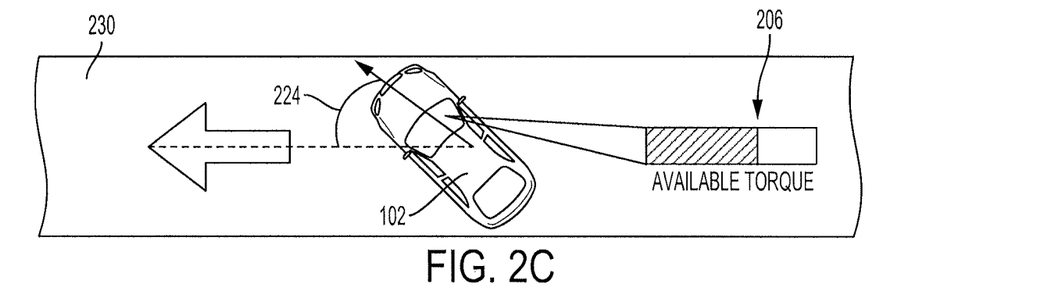

In FIG. 2C, the vehicle 102 has further turned to its left, and the error degree has been further reduced to a third error degree 224, which is less than the second error degree 222. Accordingly, an increased amount of torque (e.g., a third amount of available torque 206) may be available to the driver. The third amount of available torque 206 is greater than the second amount of available torque 204.

Figure 2D:
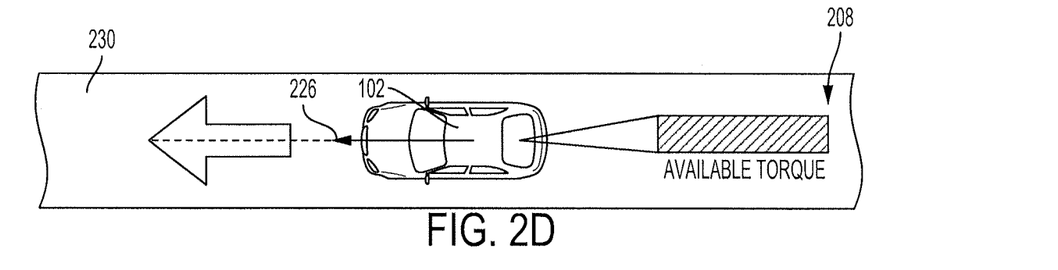

Finally, in FIG. 2D, the vehicle 102 has realigned with the correct driving direction. The fourth error degree 226 is zero or substantially close to zero, and all of the torque 208 capable of being output by the vehicle 102 is available to the driver. In some embodiments, when the error degree is less than a threshold error degree (e.g., 45 degrees or less or 90 degrees or less), all of the torque capable of the being output by the vehicle 102 is available to the driver. In one embodiment, the error degree may be inversely proportional to the amount of torque available to the vehicle or the driver.

In some embodiments, the amount of torque available to the driver may be visually, audibly, or tactilely provided to the driver. The display may show a number or a meter to indicate the amount of available torque available to the driver and that the vehicle is travelling in a wrong direction. This may help the driver to understand why the available torque has been reduced, if the driver is not already aware.

The audible indication may similarly inform the driver through words that the vehicle is travelling in the wrong direction, and an available amount of torque for the driver to use. The audible indication may also be a series of beeps, with the interval between the beeps changing as the vehicle reorients itself to the correct direction. The interval between the beeps may start with a relatively short time between the beeps to indicate the urgency of the situation, and the interval between the beeps may grow greater as the vehicle is reoriented to the correct direction. Alternatively, the interval between the beeps may start with a relatively long time between the beeps, and may gradually become shorter as the driver reorients the vehicle, to provide a positive feedback to the driver as the driver turns the vehicle in the correct direction.

The tactile indication may be a series of vibrations to the steering wheel and/or the driver's seat. Similar to the audible indication, the interval between the vibrations may change as the vehicle reorients itself to the correct direction. The interval between the vibrations may start with a relatively short time between the vibrations to indicate the urgency of the situation, and the interval between the vibrations may grow greater as the vehicle is reoriented to the correct direction. Alternatively, the interval between the vibrations may start with a relatively long time between the vibrations, and may gradually become shorter as the driver reorients the vehicle, to provide a positive feedback to the driver as the driver turns the vehicle in the correct direction.

In some embodiments, the available torque provided to each wheel may also be controlled. When the vehicle 102 detects that the driver is turning in a particular direction back toward the correct direction, the vehicle 102 may selectively limit torque for particular wheels. The vehicle 102 may detect the direction the driver is turning based on the steering wheel or the vehicle orientation sensor.

For example, in FIGS. 2B and 2C, the vehicle 102 may detect that the vehicle is being turned to the left in order to re-orient the vehicle to the correct direction. Accordingly, in some embodiments, the available torque to the driver's side rear wheel may be less than the available torque to one or more of the other wheels (e.g., the passenger's side front wheel, the passenger's side rear wheel, and/or the driver's side front wheel). In other embodiments, the available torque to the front wheels may be greater than the available torque to the rear wheels. When different torque is provided to different wheels, the vehicle may be able to turn more quickly. In the example of FIGS. 2B and 2C, when the available torque to the driver's side rear wheel is less than the available torque to one or more of the other wheels, the vehicle 102 may be able to turn left (and back to the correct direction) more quickly.

The division of available torque to the wheels may vary. For example, in some embodiments, the torque provided to the wheels may be controlled individually. In other embodiments, the torque provided to the driver's side wheels may be different than the torque provided to the passenger's side wheels. In some embodiments, the torque provided to the front wheels may be different than the torque provided to the rear wheels.

Figure 2E:
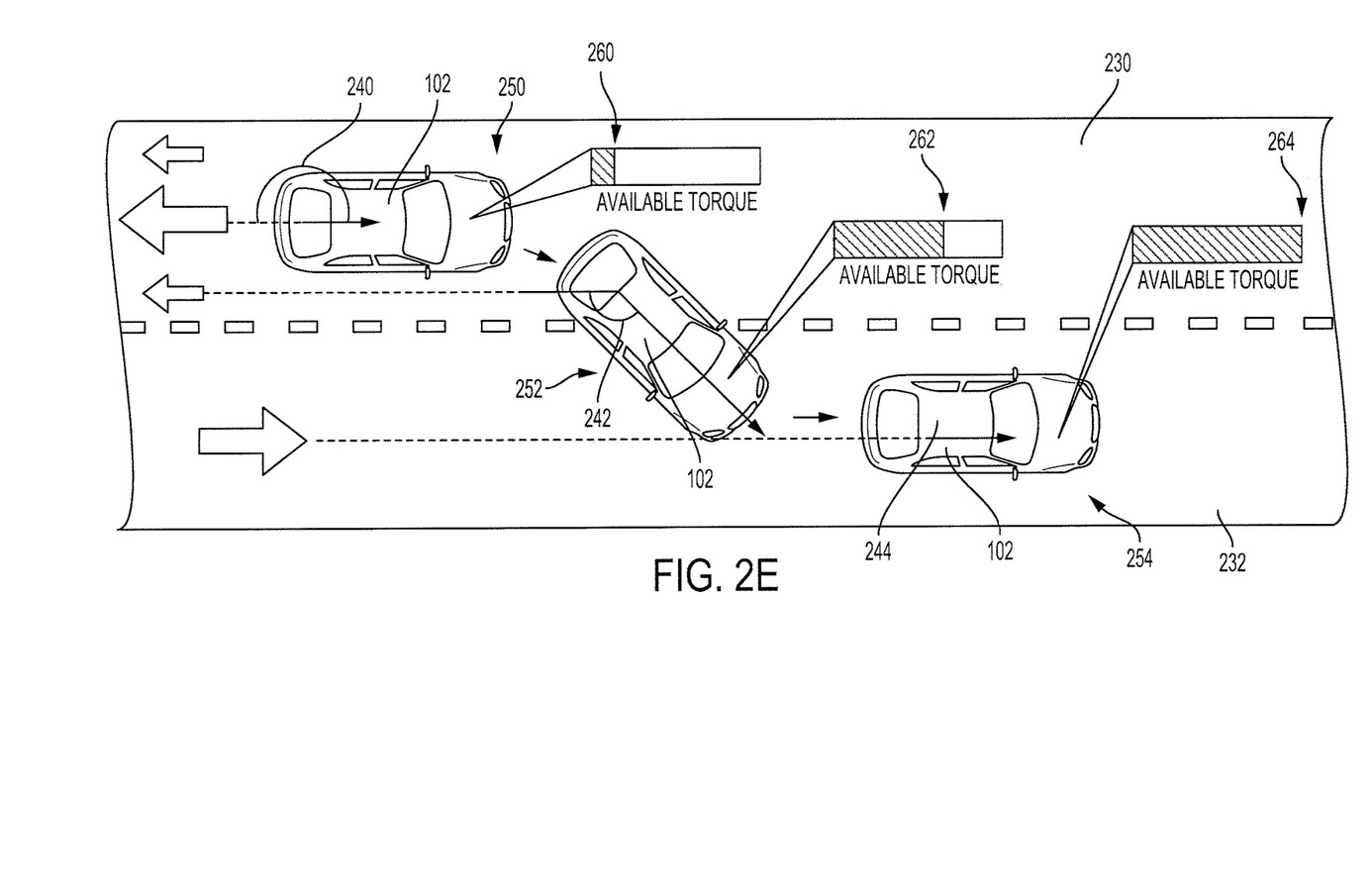

FIG. 2E illustrates the series of changes in available torque when a driver, instead of turning around in the same lane, as in FIGS. 2A-2D, simply changes lanes to the correct lane.

At a first position 250, the vehicle 102 is facing the wrong direction. The vehicle 102 has a first error degree 240 of 180 degrees. Accordingly, a first, minimum amount of torque 260 is available to the driver.

At the second position 252, the vehicle 102 approaches and crosses over the lane markers. At this point, the vehicle 102 is partly in the wrong first lane 230 and is partly in the correct second lane 232. The second error degree 242 may be measured with respect to the first direction of the first lane 230 or the second direction of the second lane 232. In either case, the corresponding second amount of available torque 262 (greater than the first amount of torque 260) is available to the driver.

A constant point of reference on the vehicle may be used for purposes of determining the error degree. For example, in position 252, if the front of the vehicle 102 (located in the correct second lane 232) were used for determining the error degree, it would be less than if the rear of the vehicle 102 (located in the wrong first lane 230) were used for determining the error degree. In some embodiments, the point of reference is a location on the vehicle corresponding to where the driver is located. In some embodiments, it is the front most point of the vehicle. In other embodiments, it is the rear most point of the vehicle. The point of reference may be where the GPS unit is located, in order to determine with the most precision where the vehicle is located, to determine whether the vehicle is in the correct lane or the wrong lane.

When in the second position 252, there is more torque available to the vehicle 102 than when the vehicle 102 is in the first position 250. Again, the second amount of torque 262 available to the driver is greater than the first amount 260, as illustrated in FIG. 2E.

Finally, when in the third position 254, all of the torque 264 capable of being produced by the vehicle 102 is available to the vehicle 102. In this regard, the third error degree 244 is below a threshold error degree (e.g., 45 degrees or less or 90 degrees or less), and when the error degree is below the threshold error degree, the vehicle 102 has all of the torque capable of being produced by the vehicle 102 is available to the vehicle 102.

In some embodiments, the determination that the vehicle 102 is driving in the wrong direction may not be triggered until the error degree exceeds a wrong-way threshold. In some embodiments, the wrong-way threshold is 90 degrees. Accordingly, the reduction in available torque may not be triggered until the error degree exceeds the wrong-way threshold.

In many embodiments, the available torque may be limited when the vehicle is driving forward, but there may be no limitations to the available torque when the vehicle is in a reverse gear.

In some embodiments, the vehicle 102 may include a manual override, which, when triggered, allows the vehicle 102 to operate normally, regardless of orientation. The manual override may be used in situations where there is an emergency situation and it is safer to travel in the wrong direction than to continue in the correct direction. For example, the vehicle 102 may be travelling in a two-lane road and there may be a fallen tree or a pedestrian in the road, and the vehicle 102 may perform a maneuver into the other lane in the wrong direction. In some embodiments, the manual override is a button within reach of the driver within the passenger cabin. In some embodiments, the manual override is a touchscreen icon in a menu on the vehicle control panel (e.g., within the infotainment unit of the vehicle). In some embodiments, the manual override is voice-activated, and the driver may speak a particular passphrase or passcode to activate manual override.

Figure 3A:
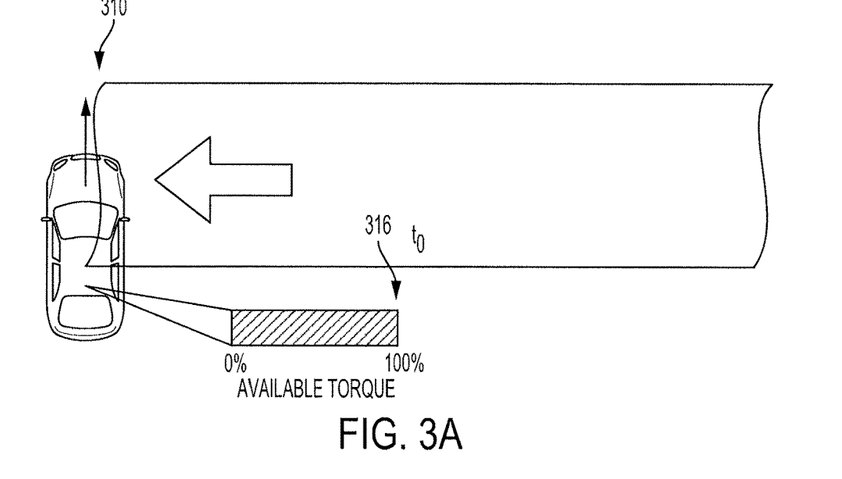
FIGS. 3A-3C illustrate an example system for notifying a driver that the vehicle is being driven in a wrong direction based on distance and/or time, according to various embodiments of the invention.
Figure 3B:
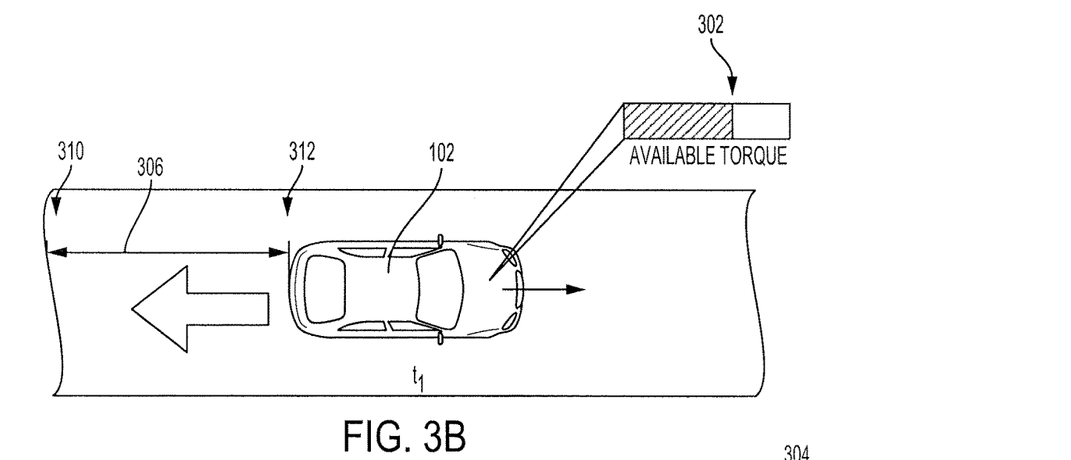
Figure 3C:
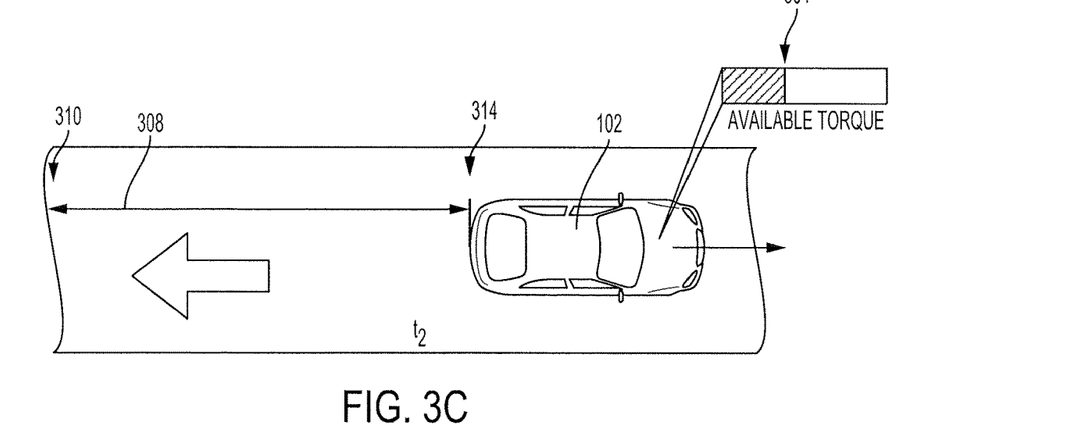

FIGS. 3A-3C illustrate the torque available to the vehicle being limited based on how long and/or how far the vehicle 102 has been driving in the wrong direction.

As shown in FIG. 3A, the vehicle 102, at time $t_0$, begins to travel in the wrong direction, beginning at origin location 310. Until the moment the vehicle 102 is determined to be travelling in the wrong direction, all of the torque 316 the vehicle 102 is capable of producing is available to the driver. The origin location 310 and/or the time $t_0$ may be stored in the memory for later reference.

The determination of the vehicle 102 being driven in the wrong direction may be made based on detection of features in the vicinity of the vehicle 102, or using the location of the vehicle 102 and the orientation of the vehicle 102, as described herein.

As shown in FIG. 3B, the vehicle 102 has been driven in the wrong direction for a first distance 306. The vehicle 102 is now at a first location 312. The distance between the first location 312 and the origin location 310 is the first distance 306. Also as shown in FIG. 3B, the vehicle 102 has been driving in the wrong direction for a first time ($t_1$-$t_0$), and a first amount of torque 302 is available to the driver. The first amount of torque 302 is less than all of the torque the vehicle 102 is capable of producing 316.

As shown in FIG. 3C, the vehicle 102 has been driven in the wrong direction for a second distance 308. The vehicle 102 is now at a second location 314. The distance between the second location 314 and the origin location 310 is the second distance 308. Also as shown in FIG. 3C, the vehicle 102 has been driving in the wrong direction for a second time ($t_2$-$t_0$), and a second amount of torque 304 is available to the driver. The second amount of torque 304 is less than the first amount of torque 302.

The amount of torque available to a vehicle travelling in the wrong direction (e.g., the first amount of torque 302 and the second amount of torque 304) may be determined based on the distance traversed while the vehicle has been driving in the wrong direction (e.g., the first distance 306 and the second distance 308) and/or the time elapsed while the vehicle has been driving in the wrong direction (e.g., the first time ($t_1$-$t_0$) and the second time ($t_2$-$t_0$)).

In some embodiments, the limiting of torque is based on only distance. For example, regardless of how quickly the vehicle 102 is travelling, the availably torque is reduced only as it gets farther away from the origin location 310 where the vehicle 102 began driving in the wrong direction.

In other embodiments, the limiting of torque is based on only time. For example, regardless of how slowly the vehicle 102 is travelling, the availability of torque is reduced only as it spends more time driving in the wrong direction.

In yet other embodiments, the limiting of torque is based on a combination of distance and time. The ratio of distance to time and how each factor contributes to the reduction of the available torque may be determined based on testing data, simulation data, or empirically, in order to encourage the driver to more expediently reorient the vehicle 102 to the correct direction.

The ratio of distance to time may also be based on the speed of the vehicle 102. For example, when the vehicle 102 is driving above a threshold speed, distance may weigh more heavily than time in the determination of how quickly to reduce the available torque. Accordingly, in these embodiments, when the vehicle 102 is driving below the threshold speed, the time may weigh more heavily than distance in the determination of how quickly to reduce the available torque.

The ratio of the distance to time may also be based on the type of road the vehicle 102 is travelling on (e.g., a freeway, a surface street, an on-ramp, an off-ramp, a paved road, a school zone, or an unpaved road). For example, when the vehicle 102 is on a freeway, the distance may weigh more heavily than time in the determination of how quickly to reduce the available torque, as the father and faster the vehicle travels, the greater danger it may pose.

The ratio of distance to time may also be based on the time of day or the congestion level of the traffic in the vicinity of the vehicle travelling in the wrong direction. Any combination of factors described herein may be used.

Figure 4:
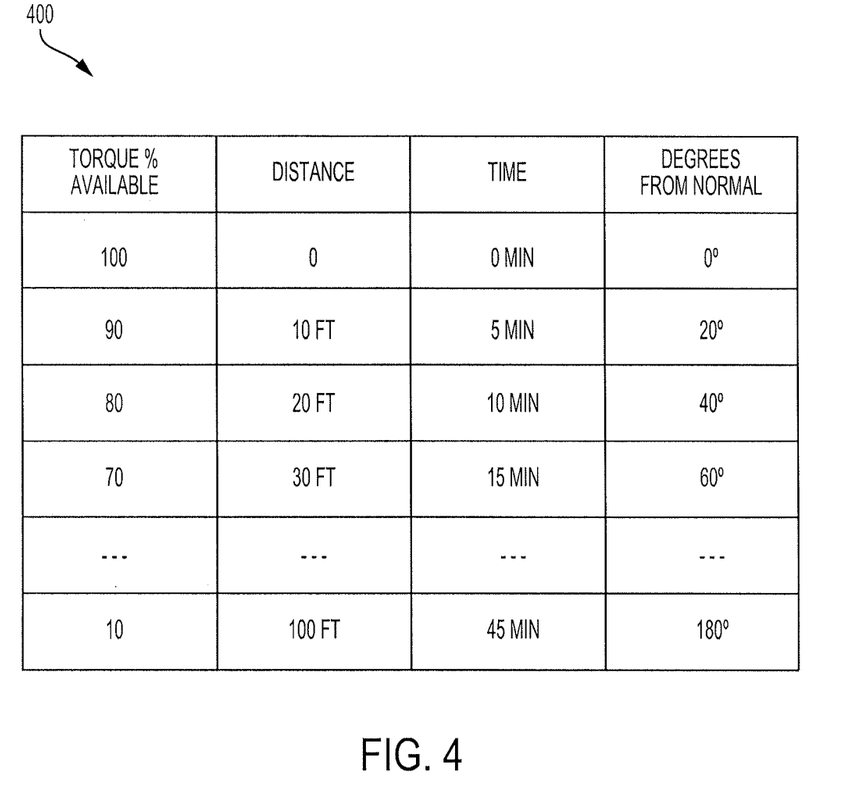
FIG. 4 illustrates a table of values used to determine a torque available to the vehicle, according to various embodiments of the invention.

FIG. 4 illustrates a table 400 stored in a memory accessible to the vehicle. The table 400 illustrates the various factors, such as distance, time, and degrees from normal, which may be used to determine the torque percentage available to the vehicle.

Any combination of the factors may be used. The determination of which factors are used may be based on one or more environmental factors, such as time of day, type of road, congestion level, and/or speed of the vehicle. For example, when the type of road is an unpaved road, the torque percentage available may be determined based on only the distance or based on a combination of distance and degrees from normal. When two factors are associated with different torque percentages, a combination of the two values may be used (e.g., an average or a weighted average).

The table 400 illustrates a relatively constant decrease of the torque available to the vehicle based on an increased distance traveled in the wrong direction, and/or an increased time elapsed while travelling in the wrong direction, and/or an increased degree(s) from normal orientation of the vehicle. This is, when the values of the table 400 are plotted on a graph, the slope of the line is relatively straight. However, in some embodiments, the values of the table 400 may be such that when plotted, the line may be curved or may have various combinations of shapes.

In some embodiments, the discrete values are not stored in a table, but instead an equation is used to determine the torque percentage available to the vehicle in a more continuous manner. In some embodiments, the torque percentage is not used, and instead values of torque (e.g., in newton meters or foot pounds) may be used.

Figure 5:
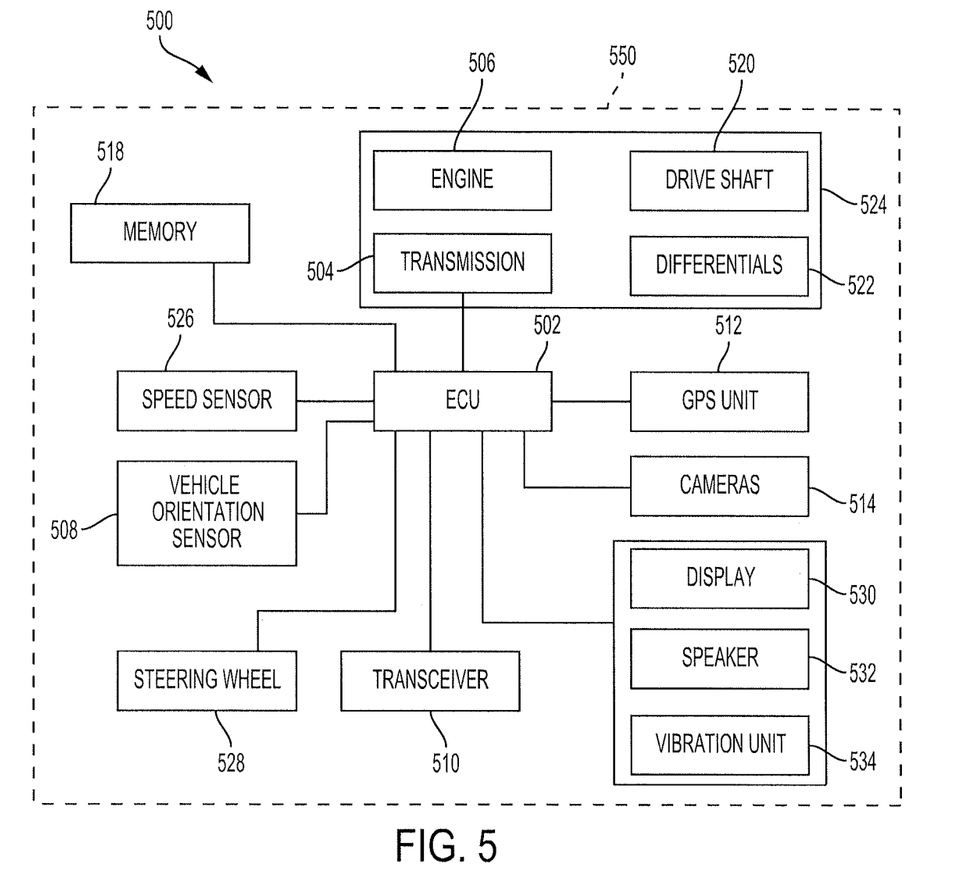
FIG. 5 illustrates the components of the one-way direction sensing system, according to various embodiments of the invention.

FIG. 5 illustrates an example one-way direction sensing system, according to various embodiments of the invention. The system 500 may be embodied in a vehicle 550 (e.g., vehicle 102). The vehicle 550 may be a fully electric vehicle, a partially electric vehicle, or a conventional vehicle powered by an internal combustion engine.

The vehicle 550 may have an automatic or manual transmission. The vehicle 550 is a conveyance capable of transporting a person, an object, or a permanently or temporarily affixed apparatus. The vehicle 550 may be a self-propelled wheeled conveyance, such as a car, a sports utility vehicle, a truck, a bus, a van or other motor or battery driven vehicle. For example, the vehicle 550 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 550 may be a semi-autonomous vehicle or an autonomous vehicle. That is, the vehicle 550 may be self-maneuvering and navigate without human input. An autonomous vehicle may use one or more sensors and/or a navigation unit to drive autonomously.

The system 500 also includes one or more computers or electronic control units (ECUs) 502, appropriately programmed, to control one or more operations of the vehicle. The one or more ECUs 502 may be implemented as a single ECU or in multiple ECUs. The ECU 502 may be electrically coupled to some or all of the components of the vehicle. In some embodiments, the ECU 502 is a central ECU configured to control one or more operations of the entire vehicle. In some embodiments, the ECU 502 is multiple ECUs located across the vehicle and each configured to control one or more local operations of the vehicle. In some embodiments, the ECU 502 is one or more computer processors or controllers configured to execute instructions stored in non-transitory memory 518.

The system 500 also includes a transmission 504, an engine/motor 506, a drive shaft 520, and differentials 522, which may together form a powertrain 524 of the vehicle 550. The powertrain 524 is configured to generate power and deliver the power to be used by the vehicle 550. The powertrain 524 and the wheels of the vehicle 550 propel the vehicle forward or backward. The components of the powertrain 524 may work together to provide, adjust, and limit the torque available to the driver of the vehicle 550, as described herein. The instructions to provide, adjust, and limit the torque available to the driver may be determined by the ECU 502 and communicated from the ECU 502 to the powertrain 524. Any combination of the elements of the powertrain 524 may be adjusted in its respective operation to adjust and/or limit the torque available to the driver.

The system 500 also includes a vehicle orientation sensor 508 configured to detect an orientation of the vehicle 550. The vehicle orientation sensor 508 may provide, to the ECU 502, vehicle orientation data indicating a direction in which the vehicle 550 is oriented. The vehicle orientation sensor 508 may be a gyroscope. The vehicle orientation sensor 508 may periodically provide to the ECU 502 the vehicle orientation data. The frequency may be every minute, every 30 seconds, or every second, for example.

The system 500 also includes a GPS unit 512 configured to detect a location of the vehicle 550. The GPS unit 512 is configured to update the location of the vehicle 550 periodically by providing location data to the ECU 502. The period of updating the location may be every minute, every 30 seconds, or every second, for example. In some embodiments, the location of the vehicle is represented by latitude and longitude coordinates. In some embodiments, the ECU 502 is configured to determine the direction the vehicle is oriented by comparing the location and/or the direction of the vehicle over time.

The system 500 also includes cameras 514 configured to capture image data. The image data may be of the environment around the vehicle 550. The ECU 502 may use the image data to determine whether the vehicle 550 is travelling in a wrong direction. For example, the ECU 502 may determine that the vehicle 550 is travelling in the wrong direction when the backs of signs are detected in the image data within a threshold distance of the vehicle 550. In another example, the ECU 502 may determine that the vehicle 550 is travelling in the wrong direction when arrow signs on the ground are in the opposite direction are detected in the image data. In yet another example, the ECU 502 may determine that the vehicle 550 is on an on-ramp or off-ramp based on the angle of incline detected in the image data.

The system 500 also includes a memory 518. The memory 518 is configured to store data described herein, such as the table 400 of FIG. 4 or any equation used to determine the degree by which the torque available to the vehicle 550 should be reduced. The memory 518 is also configured to store map data. The map data may indicate a correct driving direction and orientation for each road, along with the boundaries of each road. The map data may be used by the ECU 502 along with the location data from the GPS unit 512 and the vehicle orientation data from the vehicle orientation sensor 508 to determine whether the vehicle 550 is driving in the correct direction or the wrong direction.

The system 500 also includes a display 530 configured to alert the driver of the vehicle 550 that the vehicle is being driven the wrong way. The display 530 may also be configured to indicate to the driver a degree by which the vehicle 550 is travelling the wrong way, and an extent by which the available torque of the vehicle 550 has been reduced.

The system 500 also includes a speaker 532 and a vibration unit 534, similarly configured to alert the driver of the vehicle 550 that the vehicle is being driven the wrong way, to indicate to the driver a degree by which the vehicle 550 is travelling the wrong way, and to indicate the extent by which the available torque of the vehicle 550 has been reduced. The vibration unit 534 may be located in the steering wheel 528 or in the driver's seat.

The system 500 also includes a transceiver 510. The transceiver 510 is configured to transmit and/or receive data. The transceiver 510 may also communicate a signal to the transceivers of other vehicles when the vehicle 550 is driving in the wrong direction. The other vehicles, particularly the vehicles in close proximity and the vehicles driving in the opposite direction as the vehicle 550, may react accordingly. In some embodiments, the other vehicles may slow down their speed to avoid a collision with the vehicle 550 driving in the wrong direction. In some embodiments, when the other vehicles are fully autonomous or semi-autonomous vehicles, the other vehicles may steer away from the vehicle 550 driving in the wrong direction.

In some embodiments, the other vehicles may notify the respective drivers of the other vehicles that a nearby vehicle is driving in the wrong direction. The alerts to the other drivers of the other vehicles may be a visual alert, an audio alert, or a tactile alert within the passenger cabins of the respective other vehicles. The visual alert may be a warning display on a display screen in the passenger cabin, the instrument panel, or a projected heads up display. The audio alert may be a chime, a spoken verbal alert, and/or an alarm. The tactile alert may be a vibration of a steering wheel or a driver's seat.

In some embodiments, the transceiver 510 may send a signal to a law enforcement system notifying the law enforcement authorities that the vehicle 550 is driving in the wrong direction, and the location data of the vehicle 550 may also be communicated. The transceiver 510 may receive the signal from a remote device, e.g., a law enforcement device, that cannot be overridden by the driver or the ECU 502. The remote signal can be received by the ECU 502 and instructs the ECU 502 to immediately reduce the torque and potentially stop the vehicle in situations where the vehicle is being chased by a law enforcement vehicle. The chased vehicle may be travelling in the wrong direction or may be driving at an excessive speed or with a dangerous driving style. The remote device can send signals or commands to the transceiver 510 and/or the ECU 502 to remotely make adjustments to the torque available (may even remotely stop the vehicle) to the vehicle until the law enforcement vehicle catches the violating vehicle or driver.

The vehicle 550 may be coupled to a network via the transceiver 510. The network, such as a local area network (LAN), a wide area network (WAN), a cellular network, a digital short-range communication (DSRC), the Internet, or a combination thereof, connects the vehicle 550 to a remote data server. The remote data server may be one or more servers from different service providers. Each of the one or more servers may be connected to one or more databases. A service provider may provide navigational map, weather and/or traffic data to the vehicle 550.

In some situations, certain lanes may have variable lane directions based on the time and day. For example, a particular lane may allow for drivers to travel north during the times of 6 AM to 7 PM on weekdays and south during any other time. The direction of a lane at any given point may be communicated to the vehicle 550 via the transceiver 510 from a remote data server. Any other data pertaining to the status of a lane may also be communicated to the vehicle 550 via the transceiver 510 from a remote data server.

A database is any collection of pieces of information that is organized for search and retrieval, such as by a computer or a server, and the database may be organized in tables, schemas, queries, reports, or any other data structures. A database may use any number of database management systems and may include a third-party server or website that stores or provides information. The information may include real-time information; periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such as the grade of an incline of a road, a terrain type of the road, or a curvature of the road. The construction information includes construction features such as construction zones and construction hazards.

The traffic data includes one or more traffic condition features, such as traffic congested areas or accident areas. The traffic data may provide information related to the density and movement of vehicles on a roadway and/or accident locations.

The features, e.g., road features, political features, or traffic data, each have a location that may be identified by map coordinates. The map coordinates may be defined by latitude and longitude coordinates.

The transceiver 510 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 510 may transmit data to and receive data from devices and systems not directly connected to the vehicle 550. For example, the ECU 502 may communicate (i.e., send and receive data) with the remote data server. Furthermore, the transceiver 510 may access the network, to which the remote data server is also connected.

The system 500 includes a speed sensor 526 configured to detect the speed of the vehicle 550. The ratio of distance to time in determining the degree to which the available torque of the vehicle should be limited may be based on the speed of the vehicle, as described herein.

The system 500 also includes a steering wheel 528 having an adjustable turning stiffness. The turning stiffness of the steering wheel 528 may be adjusted based on the orientation of the vehicle 550 when the vehicle 550 is facing the wrong direction, as described herein.

As used herein, a "unit" may refer to hardware components, such as one or more computer processors, controllers, or computing devices configured to execute instructions stored in a non-transitory memory.

Figure 6A:
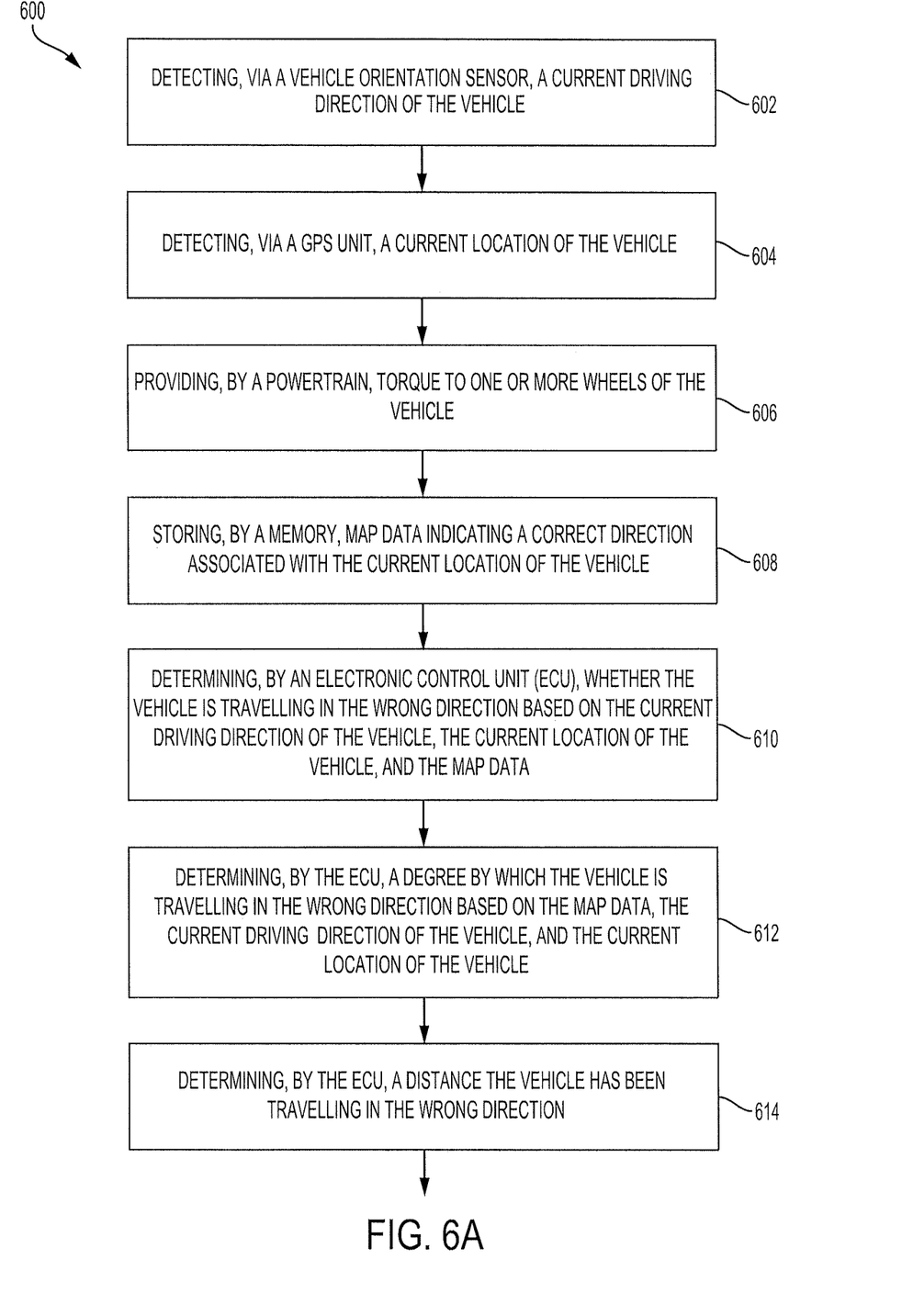
FIGS. 6A-6B illustrate a flow diagram of a process performed by the one-way direction sensing system, according to various embodiments of the invention.
Figure 6B:
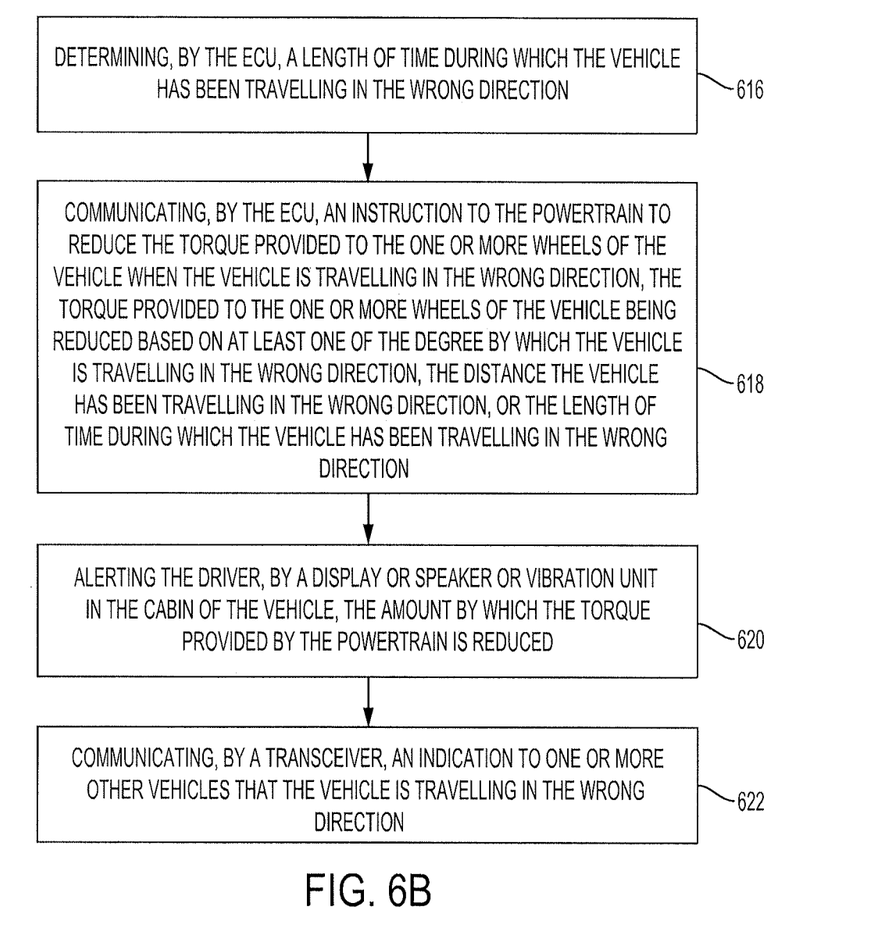

FIGS. 6A-6B are a flow diagram of a process 600 performed by the one-way direction sensing system, according to various embodiments of the invention.

The vehicle orientation sensor detects a current driving direction of the vehicle (step 602). In some embodiments, the vehicle orientation sensor is a gyroscope. In some embodiments, the vehicle orientation sensor is embodied by the ECU, which compares the location of the vehicle over time to determine the current driving direction of the vehicle.

The GPS unit of the vehicle detects a current location of the vehicle (step 604). The GPS unit may provide location data to the ECU in terms of location coordinates which may be referenced on a map. The location coordinates may be in latitude and longitude coordinates or in any other cartographic system. The GPS unit is configured to update the location of the vehicle 550 periodically by providing location data to the ECU 502. The period of updating the location may be every minute, every 30 seconds, or every second, for example.

The powertrain of the vehicle provides torque to one or more wheels of the vehicle (step 606). The powertrain is configured to generate power and deliver the power to be used by the vehicle. A transmission, an engine/motor, a drive shaft, and/or differentials may form the powertrain. The powertrain and the wheels of the vehicle propel the vehicle forward or backward. The components of the powertrain may work together to provide, adjust, and limit the torque available to the driver of the vehicle, as described herein. The instructions to provide, adjust, and limit the torque available to the driver may be determined by the ECU and communicated from the ECU to the powertrain.

A memory stores map data indicating a correct direction associated with the current location of the vehicle (step 608). The map data may have an association of each location on a map having a road, and a corresponding correct direction of travel for each location. The corresponding correct direction of travel may be represented as a compass direction or a relative direction from a common reference point.

The ECU determines whether the vehicle is travelling in the wrong direction based on the current driving direction of the vehicle, the current location of the vehicle, and the map data (step 610). Based on the map data and the current location of the vehicle, the ECU may be able to determine a correct direction of travel, and based on the current driving direction of the vehicle, the correct driving direction and the current driving direction may be compared to determine whether the vehicle is travelling in the wrong direction.

In some embodiments, the ECU determines that the vehicle is travelling in the wrong direction when the current driving direction and the correct driving direction have a difference that exceeds a threshold value. For example, when the current driving direction and the correct driving direction have a difference that exceeds 90 degrees, the ECU may determine that the vehicle is travelling in the wrong direction.

When it is determined that the vehicle is travelling in the wrong direction, the ECU may determine the degree by which the vehicle is being driven in the wrong direction (step 612). The degree by which the vehicle is being driven in the wrong direction may be a difference between the current driving direction and the correct driving direction. The difference may be represented by an angle having a degree measurement.

When it is determined that the vehicle is travelling in the wrong direction, the ECU may determine the distance the vehicle has been driving in the wrong direction (step 614). The ECU may store the beginning location (or origin location) of when the vehicle began to travel in the wrong direction in the memory, and may compare the current location to the beginning location using the map data to determine the distance the vehicle has been driving in the wrong direction.

When it is determined that the vehicle is travelling in the wrong direction, the ECU may determine the length of time the vehicle has been driving in the wrong direction (step 616). The ECU may store the beginning time of when the vehicle began to travel in the wrong direction in the memory, and may compare the current time to the beginning time to determine the duration for which the vehicle has been driving in the wrong direction.

The ECU communicates an instruction to the powertrain to reduce the torque provided to the one or more wheels of the vehicle when the vehicle is travelling in the wrong direction (step 618). The reduction of torque may be determined based on at least one of: (1) the degree by which the vehicle is travelling in the wrong direction, as determined in step 612, (2) the distance the vehicle has been driving in the wrong direction, as determined in step 614, or (3) the length of time the vehicle has been driving in the wrong direction, as determined in step 616.

The driver may be alerted of the amount by which the torque of the vehicle has been reduced by a display, a speaker, or a vibration unit (step 620). The alert may provide additional explanation to the driver of why the vehicle may be travelling slower, and may encourage the driver to correct the orientation of the vehicle.

A transceiver of the vehicle may communicate an indication to one or more other vehicles in the vicinity that the vehicle is travelling in the wrong direction (step 622). The other vehicles may react accordingly. For example, the other vehicles may slow down or turn away from the wrong-direction vehicle.

In some embodiments, the transceiver communicates an indication to a remote server or other remotely located device, which alerts an enforcement authority, such as police, of the vehicle being driven in the wrong direction.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for preventing a vehicle from driving in a wrong direction, the system comprising:
    a vehicle orientation sensor configured to detect a current driving direction of the vehicle;
    a GPS unit configured to detect a current location of the vehicle;
    a powertrain configured to provide torque to one or more wheels of the vehicle; and an electronic control unit (ECU) connected to the vehicle orientation sensor, the GPS unit, and the powertrain and configured to:
- determine whether the vehicle is travelling in the wrong direction based on the current driving direction of the vehicle and the current location of the vehicle, and
- communicate an instruction to the powertrain to continuously reduce the torque provided to the one or more wheels of the vehicle while the vehicle is travelling in the wrong direction until a minimum amount of torque for turning the vehicle around is available to the vehicle.

2. The system of claim 1, further comprising a memory configured to store map data indicating a correct direction associated with the current location of the vehicle, and
- wherein the ECU is configured to determine whether the vehicle is travelling in the wrong direction based on the map data in addition to the current driving direction of the vehicle and the current location of the vehicle.

3. The system of claim 2, wherein the ECU is further configured to determine a degree by which the vehicle is travelling in the wrong direction based on the map data, the current driving direction of the vehicle, and the current location of the vehicle, and
- wherein the torque provided to the one or more wheels of the vehicle being reduced based on the degree by which the vehicle is travelling in the wrong direction.

4. The system of claim 1, wherein the ECU is further configured to determine a length of time during which the vehicle has been travelling in the wrong direction, and
- wherein the torque is reduced based on the length of time during which the vehicle has been travelling in the wrong direction.

5. The system of claim 1, further comprising a display or speaker or vibration unit in the cabin of the vehicle configured to alert a driver of the vehicle that the vehicle is driving in the wrong direction in response to the ECU determining that the vehicle is driving in the wrong direction.

6. The system of claim 1, further comprising a steering wheel having an adjustable turning stiffness, the ECU further configured to determine the turning stiffness of the steering wheel based on the current driving direction of the vehicle, the steering wheel having a normal turning stiffness when turned in a correction direction and an increased turning stiffness when subsequently turned in a direction opposite the correction direction.

7. The system of claim 1, wherein the ECU is further configured to compare the current driving direction of the vehicle to a correct direction to determine whether a threshold error degree has been exceeded, and
- wherein the determination of whether the vehicle is travelling in the wrong direction is made in response to the determination that the threshold error degree has been exceeded.

8. The system of claim 1, further comprising a display or speaker or vibration unit in the cabin of the vehicle configured to alert a driver of an amount by which the torque provided by the powertrain is reduced.

9. The system of claim 1, further comprising a transceiver configured to communicate an indication to one or more other vehicles that the vehicle is travelling in the wrong direction.

10. The system of claim 1, wherein the ECU is further configured to:
- determine a distance the vehicle has been travelling in the wrong direction, and
- determine a torque percentage available to the vehicle proportional to the distance the vehicle has been travelling in the wrong direction, and
- wherein the reduction of the torque is based on the torque percentage available to the vehicle.

11. A method for preventing a vehicle from driving in a wrong direction, the method comprising:
- detecting, via a vehicle orientation sensor, a current driving direction of the vehicle;
- detecting, via a GPS unit, a current location of the vehicle;
- providing, by a powertrain, torque to one or more wheels of the vehicle;
- determining, by an electronic control unit (ECU), whether the vehicle is travelling in the wrong direction based on the current driving direction of the vehicle and the current location of the vehicle; and
- communicating, by the ECU, an instruction to the powertrain to continuously reduce the torque provided to the one or more wheels of the vehicle while the vehicle is travelling in the wrong direction until a minimum amount of torque for turning the vehicle around is available to the vehicle.

12. The method of claim 11, further comprising storing, by a memory, map data indicating a correct direction associated with the current location of the vehicle, and
- wherein the determining of whether the vehicle is travelling in the wrong direction is based on the map data in addition to the current driving direction of the vehicle and the current location of the vehicle.

13. The method of claim 12, further comprising determining, by the ECU, a degree by which the vehicle is travelling in the wrong direction based on the map data, the current driving direction of the vehicle, and the current location of the vehicle, and
- wherein the torque provided to the one or more wheels of the vehicle is reduced based on the degree by which the vehicle is travelling in the wrong direction.

14. The method of claim 11, further comprising determining, by the ECU, a length of time during which the vehicle has been travelling in the wrong direction, and
- wherein the torque is reduced proportional to the length of time during which the vehicle has been travelling in the wrong direction.

15. The method of claim 11, further comprising comparing, by the ECU, the current driving direction of the vehicle to a correct direction to determine whether a threshold error degree has been exceeded, and
- wherein the determination of whether the vehicle is travelling in the wrong direction is made in response to the determination that the threshold error degree has been exceeded.

16. The method of claim 11, further comprising alerting, by a display or speaker or vibration unit in the cabin of the vehicle, a driver of an amount by which the torque provided by the powertrain is reduced.

17. The method of claim 11, further comprising communicating, by a transceiver, an indication to one or more other vehicles that the vehicle is travelling in the wrong direction.

18. The method of claim 11, further comprising:
- determining, by the ECU, a distance the vehicle has been travelling in the wrong direction; and
- determining, by the ECU, a torque percentage available to the vehicle proportional to the distance the vehicle has been travelling in the wrong direction, and
- wherein the reduction of the torque is based on the torque percentage available to the vehicle.

19. A vehicle configured to travel along a road having a correct direction and a wrong direction, the vehicle comprising:
- a GPS unit configured to periodically detect a current location of the vehicle;
- a powertrain configured to provide torque to one or more wheels of the vehicle; and
- an electronic control unit (ECU) connected to the GPS unit and the powertrain, and configured to:
  - determine a current driving direction of the vehicle based on the periodically detected current location of the vehicle,
  - determine whether the vehicle is travelling in the wrong direction based on the current driving direction of the vehicle and the current location of the vehicle, and
  - communicate an instruction to the powertrain to continuously reduce the torque provided to the one or more wheels of the vehicle while the vehicle is travelling in the wrong direction until a minimum amount of torque for turning the vehicle around is available to the vehicle.

20. The vehicle of claim 19, further comprising a memory configured to store map data indicating a correct direction associated with the current location of the vehicle, and
wherein the ECU is configured to determine whether the vehicle is travelling in the wrong direction based on the map data in addition to the current driving direction of the vehicle and the current location of the vehicle.

21. The vehicle of claim 20, wherein the ECU is further configured to:
- determine a degree by which the vehicle is travelling in the wrong direction based on the map data, the current driving direction of the vehicle, and the current location of the vehicle, and
- determine a length of time during which the vehicle has been travelling in the wrong direction, and
- wherein the torque provided to the one or more wheels of the vehicle is reduced based on at least one of the degree by which the vehicle is travelling in the wrong direction or the length of time during which the vehicle has been travelling in the wrong direction.

22. The vehicle of claim 19, wherein the ECU is further configured to:
- determine a distance the vehicle has been travelling in the wrong direction, and
- determine a torque percentage available to the vehicle proportional to the distance the vehicle has been travelling in the wrong direction, and
- wherein the reduction of the torque is based on the torque percentage available to the vehicle.

* * * * *